(12) United States Patent
Albanese et al.

(10) Patent No.: US 7,640,198 B1
(45) Date of Patent: Dec. 29, 2009

(54) SYSTEM AND METHOD FOR GENERATING AND DISPLAYING INDEXED PRICE MODELING DATA

(75) Inventors: Michael J. Albanese, Los Gatos, CA (US); Sean M. Murphy, Danville, CA (US); Narayanan Vijaykumar, Cupertino, CA (US); Marc H. Brown, Palo Alto, CA (US); Simon C. Lee, Castro Valley, CA (US); Hannes L. Marais, Mountain View, CA (US)

(73) Assignee: Vendavo, Inc., Palo Alto, CA (US)

( * ) Notice: Subject to any disclaimer, the term of this patent is extended or adjusted under 35 U.S.C. 154(b) by 702 days.

(21) Appl. No.: 10/856,335

(22) Filed: May 28, 2004
(Under 37 CFR 1.47)

(51) Int. Cl.
*G06Q 40/00* (2006.01)
(52) U.S. Cl. .......................................... 705/35
(58) Field of Classification Search .................... 705/35
See application file for complete search history.

(56) References Cited

U.S. PATENT DOCUMENTS

| | | | |
|---|---|---|---|
| 3,806,711 A | 4/1974 | Cousins, Jr. |
| 5,053,957 A | 10/1991 | Suzuki |
| 5,224,034 A | 6/1993 | Katz et al. |
| 5,461,708 A | 10/1995 | Kahn |
| 5,497,489 A | 3/1996 | Menne |
| 5,537,590 A | 7/1996 | Amado |
| 5,590,269 A | 12/1996 | Kruse et al. |
| 5,670,984 A | 9/1997 | Robertson et al. |
| 5,689,287 A | 11/1997 | Mackinlay et al. |
| 5,710,887 A | 1/1998 | Chelliah et al. |
| 5,740,448 A | 4/1998 | Gentry et al. |
| 5,758,327 A | 5/1998 | Gardner et al. |
| 5,808,894 A | 9/1998 | Wiens et al. |
| 5,870,717 A | 2/1999 | Wiecha |
| 5,873,069 A | 2/1999 | Reuhl et al. |
| 5,878,400 A | 3/1999 | Carter, III |
| 5,946,666 A | 8/1999 | Nevo et al. |
| 6,009,407 A | 12/1999 | Garg |
| 6,075,530 A | 6/2000 | Lucas et al. |
| 6,078,901 A | 6/2000 | Ching |
| 6,151,031 A | 11/2000 | Atkins et al. |
| 6,211,880 B1 | 4/2001 | Impink, Jr. |

(Continued)

FOREIGN PATENT DOCUMENTS

WO    WO 99/60486    11/1999

(Continued)

OTHER PUBLICATIONS

Origin 7.0 Help (including 21 sheets of screen shots), 2000.

(Continued)

*Primary Examiner*—Jagdish N Patel
*Assistant Examiner*—Sara Chandler
(74) *Attorney, Agent, or Firm*—Kang S. Lim (57) ABSTRACT

The present invention provides a system suitable for displaying price modeling data having an indexing module that calculates indexes based on price modeling data and a display module configured display a calculated index. Other embodiments provide a data aggregation module that aggregates indexes calculated by the indexing module that may be also be displayed.

18 Claims, 7 Drawing Sheets

U.S. PATENT DOCUMENTS

| | | | |
|---|---|---|---|
| 6,320,586 B1 | 11/2001 | Plattner et al. | |
| 6,434,533 B1 | 8/2002 | Fitzgerald | |
| 6,553,350 B2 | 4/2003 | Carter | |
| 6,665,577 B2 | 12/2003 | Onyshkevych et al. | |
| 6,678,695 B1 | 1/2004 | Bonneau et al. | |
| 6,785,664 B2 | 8/2004 | Jameson | |
| 6,801,201 B2 | 10/2004 | Escher | |
| 6,812,926 B1 | 11/2004 | Rugge | |
| 6,851,604 B2 | 2/2005 | Girotto et al. | |
| 6,856,967 B1 | 2/2005 | Woolston et al. | |
| 6,907,403 B1 | 6/2005 | Klein et al. | |
| 6,988,076 B2 | 1/2006 | Ouimet | |
| 7,015,912 B2 | 3/2006 | Marais | |
| 7,046,248 B1 | 5/2006 | Perttunen | |
| 7,076,463 B1* | 7/2006 | Boies et al. | 705/39 |
| 7,080,026 B2 | 7/2006 | Singh et al. | |
| 7,092,929 B1 | 8/2006 | Dvorak et al. | |
| 7,133,848 B2 | 11/2006 | Phillips et al. | |
| 7,149,716 B2* | 12/2006 | Gatto | 705/36 R |
| 7,155,510 B1 | 12/2006 | Kaplan | |
| 7,218,325 B1 | 5/2007 | Buck | |
| 7,233,928 B2 | 6/2007 | Huerta et al. | |
| 7,254,584 B1 | 8/2007 | Addison, Jr. | |
| 7,308,421 B2 | 12/2007 | Raghupathy et al. | |
| 7,315,835 B1 | 1/2008 | Takayasu et al. | |
| 7,343,355 B2 | 3/2008 | Ivanov et al. | |
| 2001/0003814 A1 | 6/2001 | Hirayama et al. | |
| 2002/0007323 A1 | 1/2002 | Tamatsu | |
| 2002/0032610 A1 | 3/2002 | Gold et al. | |
| 2002/0042782 A1 | 4/2002 | Albazz et al. | |
| 2002/0052817 A1 | 5/2002 | Dines et al. | |
| 2002/0059229 A1 | 5/2002 | Natsumeda et al. | |
| 2002/0072993 A1 | 6/2002 | Sandus et al. | |
| 2002/0099596 A1 | 7/2002 | Geraghty | |
| 2002/0107819 A1 | 8/2002 | Ouimet | |
| 2002/0116348 A1 | 8/2002 | Phillips et al. | |
| 2002/0128953 A1 | 9/2002 | Quallen et al. | |
| 2002/0152133 A1 | 10/2002 | King et al. | |
| 2002/0152150 A1 | 10/2002 | Cooper et al. | |
| 2002/0156695 A1 | 10/2002 | Edwards | |
| 2002/0165726 A1 | 11/2002 | Grundfest | |
| 2002/0165760 A1 | 11/2002 | Delurgio et al. | |
| 2002/0178077 A1 | 11/2002 | Katz et al. | |
| 2002/0188576 A1 | 12/2002 | Peterson et al. | |
| 2002/0194051 A1 | 12/2002 | Hall et al. | |
| 2003/0028451 A1 | 2/2003 | Ananian | |
| 2003/0033240 A1 | 2/2003 | Balson et al. | |
| 2003/0095256 A1 | 5/2003 | Cargill et al. | |
| 2003/0110066 A1 | 6/2003 | Walser et al. | |
| 2003/0126053 A1 | 7/2003 | Boswell et al. | |
| 2003/0130883 A1 | 7/2003 | Schroeder et al. | |
| 2003/0167209 A1* | 9/2003 | Hsieh | 705/26 |
| 2003/0191723 A1 | 10/2003 | Foretich et al. | |
| 2003/0195810 A1 | 10/2003 | Raghupathy et al. | |
| 2003/0200185 A1 | 10/2003 | Huerta et al. | |
| 2003/0225593 A1 | 12/2003 | Ternoey et al. | |
| 2003/0229552 A1 | 12/2003 | Lebaric et al. | |
| 2004/0024715 A1 | 2/2004 | Ouimet | |
| 2004/0049470 A1 | 3/2004 | Ouimet | |
| 2004/0078288 A1 | 4/2004 | Forbis et al. | |
| 2004/0117376 A1* | 6/2004 | Lavin et al. | 707/10 |
| 2004/0128225 A1 | 7/2004 | Thompson et al. | |
| 2004/0133526 A1 | 7/2004 | Shmueli et al. | |
| 2004/0193442 A1 | 9/2004 | Kimata et al. | |
| 2004/0267674 A1 | 12/2004 | Feng et al. | |
| 2005/0004819 A1 | 1/2005 | Etzioni et al. | |
| 2005/0096963 A1 | 5/2005 | Myr et al. | |
| 2005/0197857 A1 | 9/2005 | Avery | |
| 2005/0197971 A1 | 9/2005 | Kettner et al. | |
| 2005/0256778 A1 | 11/2005 | Boyd et al. | |
| 2005/0267831 A1 | 12/2005 | Esary et al. | |
| 2005/0278227 A1 | 12/2005 | Esary et al. | |
| 2006/0004861 A1 | 1/2006 | Albanese et al. | |
| 2006/0069585 A1 | 3/2006 | Springfield et al. | |
| 2006/0241923 A1 | 10/2006 | Xu et al. | |

FOREIGN PATENT DOCUMENTS

| | | |
|---|---|---|
| WO | WO 00/29995 | 5/2000 |
| WO | WO 2005/119500 | 12/2005 |

OTHER PUBLICATIONS

Microsoft Excel 2000, 1985-1999.

Marn, Michael V. and Robert L. Rosiello, "Managing Price, Gaining Profit," Harvard Business Review, pp. 84-93 (Sep.-Oct. 1992).

"PCT International Search Report and the Written Opinion of the International Searching Authority", Application No. PCT/US 07/23740, mailed Mar. 3, 2008.

"PCT International Search Report", Application No. PCT/US07/11571, mailed Jan. 7, 2008.

"PCT International Search Report", Application No. PCT/US07/10754, mailed Nov. 7, 2007.

"PCT International Search Report", Application No. PCT/US05/14879, mailed Apr. 16, 2007.

"Written Opinion of the International Searching Authority", Application No. PCT/US05/14879, mailed Apr. 16, 2007.

"Written Opinion of the International Searching Authority", Application No. PCT/US05/14981, mailed Nov. 27, 2006.

"Written Opinion of the International Searching Authority", Application No. PCT/US05/14883, mailed Oct. 3, 2006.

"Net Commerce Launches Its FastTrack Configurator and FasPac Catalog Utility", Apr. 17, 2001, Business Wire. New York. p. 1.

"SPEX Assesses B2C and B2B Electronic Commerce Software Maturity", PR Newswire. New York: p. 1.

Murphy, Diane R., "The Exciting Role of the Credit Manager in the Expanding E-Commerce Marketplace", Business Credit, vol. 10, No. 9, p. 64, Oct. 2000.

Spanbauer, Scott et al., "You've got E-mail", PC World, vol. 16, No. 6, p. 135, Jun. 1998.

Beidl, Richard et al., "The Coming of Risk-Based Pricing: Part Two", Oct. 2000, Mortgage Banking, Washington, vol. 61, Issue 1.

Kenton, Kenton B. et al., "Planning a Revenue Stream System in an E-Business Environment", 2001, Industrial Management—Data Systems, p. 406-413, 8/9;ABI/INFORM Global.

"eMerchant, magic Software's Powerful New Business-to-Business E-commerce Solution. Wins 'Best of Show' at Internet Commerce Expo", Apr. 1, 1999, Business Wire, (2 pages).

Bourne, Humphrey, "Pricing the Strategic Implications", Mar. 1999, Management Accounting. Magazine for Chartered Management Accountants; vol. 77, Issue 3.

"PCT International Search Report and the Written Opinion of the International Searching Authority", Application No. PCT/US07/18663, mailed Aug. 26, 2008.

Bhattacharya, Anindya et al. "Using 'smart' pricing to increase profits and maximize customer satisfaction", Aug. 2001, The National Public Accountant; vol. 25, Issue 6.

Kim, Byung-Do et al., "Modeling the Distribution of Price Sensitivity and Implications for Optimal Retail Pricing", Jul. 1995, Journal of Business & Economic Statistics; vol. 13, Issue 3.

Levy, Michael et al., "Emerging Trends in Retail Pricing Practice: Implications for Research", 2004, Journal of Retailing; vol. 80.

Hung, Chao-Shun, "Conjectural Variations and Market Performance in a Differentiated Product Industry", Dec. 1991, Atlantic Economic Journal; vol. 19, Issue 4.

Dawes, John, "Assessing the Impact of a Very Successful Price Promotion on Brand, Category and Competitor Sales", 2004, The Journal of Product and Brand Management; vol. 13, Issue 5.

Leeflang, Peter S. H. et al., "Marketing Decisions Based on Econometric Models", Spring 2002, Marketing Research; vol. 14, Issue 1.

Dawes, John, "Price Changes and Defection Levels in a Subscription-Type Market: Can An Estimation Model Really Predict Defecation Levels?", The Journal of Services Marketing; vol. 18, Issue 1.

Lucke, Dorothea et al., "A Note on R&D and Price Elasticity of Demand," Nov. 2005, Jahrbucher fur Nationalokonomie and Statistik; vol. 225, Issue 6.

Caru, Antonella et al. "Profitability and Customer Satisfaction in Services: An Integrated Perspective Between Marketing and Cost Management Analysis", 1999, International Journal of Service Industry Management; vol. 10, Issue 2.

Tollefson, John O. et al., "Aggregation Criteria in Normative Market Segmentation Theory", Aug. 1978, Journal of Marketing Research; vol. 15.

Coulter, Keith S., "Decreasing Price Sensitivity Involving Physical Product Inventory: A Yield Management Application", 2001, The Journal of Product and Brand Management; vol. 10, Issue 5.

Mills, Don, "Oil Rises on Report Showing Gasoline Supply Decline", National Post, Ont; May 30, 2003.

Keenan, Faith, "The Price is Really Right," Business Week, Mar. 31, 2003.

Chan Choi, S., Desarbo, W. S., Harker, P. T. "Product Positioning under Price Competition." Feb. 1990. Management Science, vol. 36, Issue 2, pp. 175-199.

Kirschen, D. S., Strbac, G., Cumperayot, P., de Paiva Mendes, D. "Factoring the Elasticity of Demand in Electricity Prices." May 2000. IEEE Transactions on Power Systems, vol. 15, No. 2, pp. 612-617.

Walker, Kenton B. et al., "Planning a Revenue Stream System in an E-Business Environment", 2001, Industrial Management—Data Systems, p. 406-413, 8/9;ABI/INFORM Global.

"SPEX Assesses B2C and B2B Electronic Commerce Software Maturity", PR Newswire. New York: p. 1, Apr. 28, 2000.

* cited by examiner

SYSTEM AND METHOD FOR GENERATING AND DISPLAYING INDEXED PRICE MODELING DATA

BACKGROUND

Price modeling using a variety of analytical methods has been described in many publications including, for example, economic treatises, textbooks, and patents. Numerical information culled from vast data sets containing numerous transaction based sales operations may be analyzed and displayed in any of a number of different ways such as through word processing, spreadsheets, and graphical software programs. Modeling this numerical information visually in a price modeling context presents various challenges to designers and analysts.

In order to effectively communicate via visual display methods information gleaned from data sets, designers face many challenges. In one instance the sheer number of data entries in a transaction based data warehouse can typically exceed many millions of transactions. Displaying millions of individual entries on a single display will not generally provide an analyst with useful information. That is, simply graphing a large number of entries alone will not generally provide useful insight into the characteristic and nature of the data set. In this situation, predictive analysis of the data becomes difficult, if not impossible, as a practical matter. Thus, designers must, in some fashion, aggregate, or allow the user to flexibly aggregate the data in order to display any meaningful characterization of a data set.

Typically, generally known statistical analysis methods may be employed to aggregate data. Averages, medians, modes, and other statistical methods well known in the art may be utilized to aggregate data so that trends and analysis may be affected. However, in some cases, unique methods of data aggregation may be desirable. For example, an average value of price quotes for a particular region may give a sales person a basis upon which to make a real time price quote to a customer. The average value, in this example, represents a statistical locus around which all the price quotes for that region tend to fall. Averaging has an added benefit of reducing a chosen set of data to a single number thus deriving performance gains when analyzing and manipulating the data set. However, as can be appreciated by one skilled in the art, average values cannot generally account for relative comparisons between groups of related items. To make a relative comparison between groups of related items, an index may be calculated.

Indexes, which are generally known in the art, have been employed in a variety of manners. Stock markets, for example, often use indexes as a gauge of general market condition. Index calculations are typically performed in batch processes. As such, indexes are indicators of past performance only and generally cannot be used to compare real-time data changes. Indexing also tends to aggregate data in ways that make it difficult if not impossible to explore lower level data orders such as individual transactions for example. Further, while indexes generally provide a single value as an indicator, they are not generally visualized in other ways. Thus, an innovative index calculation that may be generated in response to real-time data changes, that allows extraction and manipulation of the underlying data, and that may be visualized in new ways is desirable to achieve a more robust and rich analysis.

Another complication confronting designers in modeling and displaying large transaction based data sets is that in typical legacy systems, aggregating data often results in the loss of individual transaction information due in part to methodologies selected to enhance performance. As noted above, an average value represents a statistical locus around which all values in the data tend to fall. Also noted above, averaging represents a way of reducing a data set. In many cases, however, a finer level of granularity with respect to the data set may be desirable since, in at least some instances, outliers and dispersions of data tend to become aggregated or averaged away resulting in a distortion of original data set. Thus, for example, a data set may be reduced by averaging based on a given criteria (e.g., average prices for a given item by region). The data set, in this example, may be reduced to a single entry for each item in a given region. As an example, the average price of a widget in the western region may be represented as a single entry. Unfortunately, however, once a data set is reduced, the ability to examine a single transaction or even a group of transactions within the data set is typically severely limited or impossible. Thus, methods to recapture and display single or group transactions of a reduced data set may be desirable.

In view of the foregoing, systems and methods for generating and displaying indexed price modeling data.

SUMMARY

The present invention presents systems and methods for suitable generating and displaying indexed price modeling data. The present invention allows a user to perform index calculations in real-time and to display resulting indexes. Indexes may be summarized according to user preferences and mined to extract underlying data.

One embodiment of the present invention provides a system suitable for displaying price modeling data having an indexing module that calculates indexes based on price modeling data and a display module configured display a calculated index. Another embodiment provides a data aggregation module that aggregates indexes calculated by the indexing module that may be also be displayed.

Another embodiment of the present invention presents a method for suitably displaying price modeling data. In the method, price modeling data is used to calculate an index. Price modeling data may also be used to create an aggregate index based on user selections in accordance with the present invention. The calculated index and the aggregate index may be displayed in any combination.

In still other embodiments of the present invention provides a computer program product in a computer readable media suitable for displaying price modeling data. The computer program product includes an index calculation module that calculates indexes based on price modeling data and a display module configured to display calculated indexes.

BRIEF DESCRIPTION OF THE DRAWINGS

Embodiments of the invention may best be understood by reference to the following description taken in conjunction with the accompanying drawings in which.

DETAILED DESCRIPTION

Figure 1:
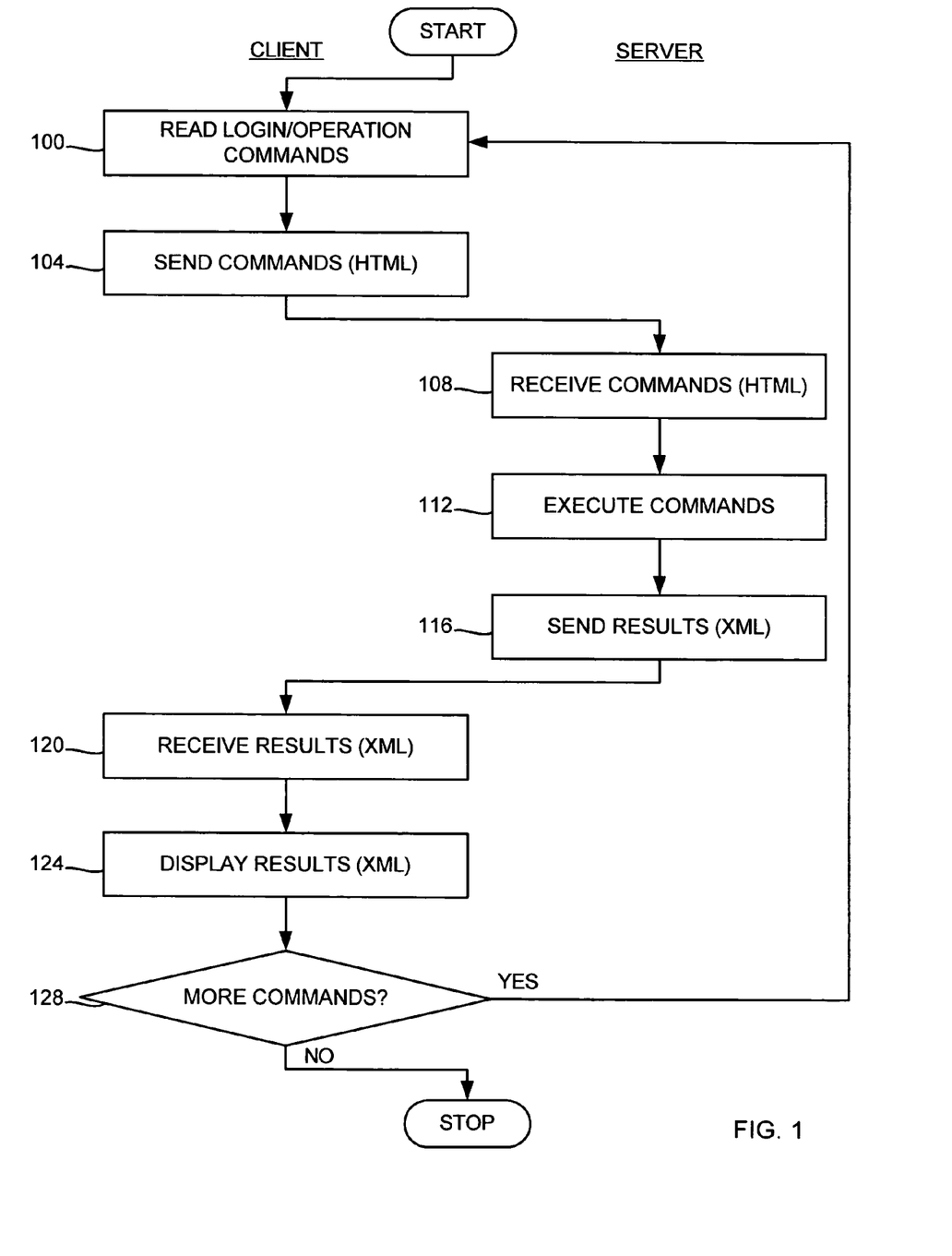
FIG. 1 is a flow chart illustrating a simplified client and server communication schema in accordance with an embodiment of the present invention.

FIG. 1 is a flow chart illustrating a simplified client and server communication system in accordance with an embodiment of the present invention. In general, clients are available via the Internet and may reside locally or remotely from a server or group of servers. Thus, the context in which the foregoing communications are made is illustrated here. At a step 100, client login and operation(s) may be made. Login and operation(s) may be enabled to generate commands that are sent to a server at step 104. Login commands and operation(s) commands may be made by the user through a browser interface which generates HTML data to be forwarded to a server or group of servers. The described invention, however, is not limited to Internet browsers and may be implemented with any suitable network communication protocol. The commands sent to servers are received by the servers at step 108. Commands sent by the client may then be executed at step 112. In this manner, the computational horsepower necessary to manipulate data set commands is centralized. Thus, the client need only contain sufficient computational power to send commands, receive results, and display results. As can be appreciated by one skilled in the art, centralizing computational horsepower lowers cost to entry for client side users. Network and software maintenance may also realize efficiencies due to centralization.

Once commands are executed by a server or servers, results may be sent to a client in XML at step 116. XML does not return transactional data to be processed and displayed by a client. Rather, as noted above, the command computations are executed at a server level which then returns XML to a client to display computational results. In this manner, results may be displayed by any method capable of displaying XML data. The described invention, however, is not limited to sending and receiving XML data and may thus be implemented using any suitable network communication protocol. Results sent in step 116 may be received by a client at step 120 and displayed by a client at step 124. In the example embodiment provided, any XML capable browser may display results received at step 120.

Once results are displayed, a client determines whether more commands are to be processed at step 128. If more commands need to be processed, the method returns to step 100 and processes commands as described above. When all commands have been completed, a user may sign off and the method ends.

Figure 2:
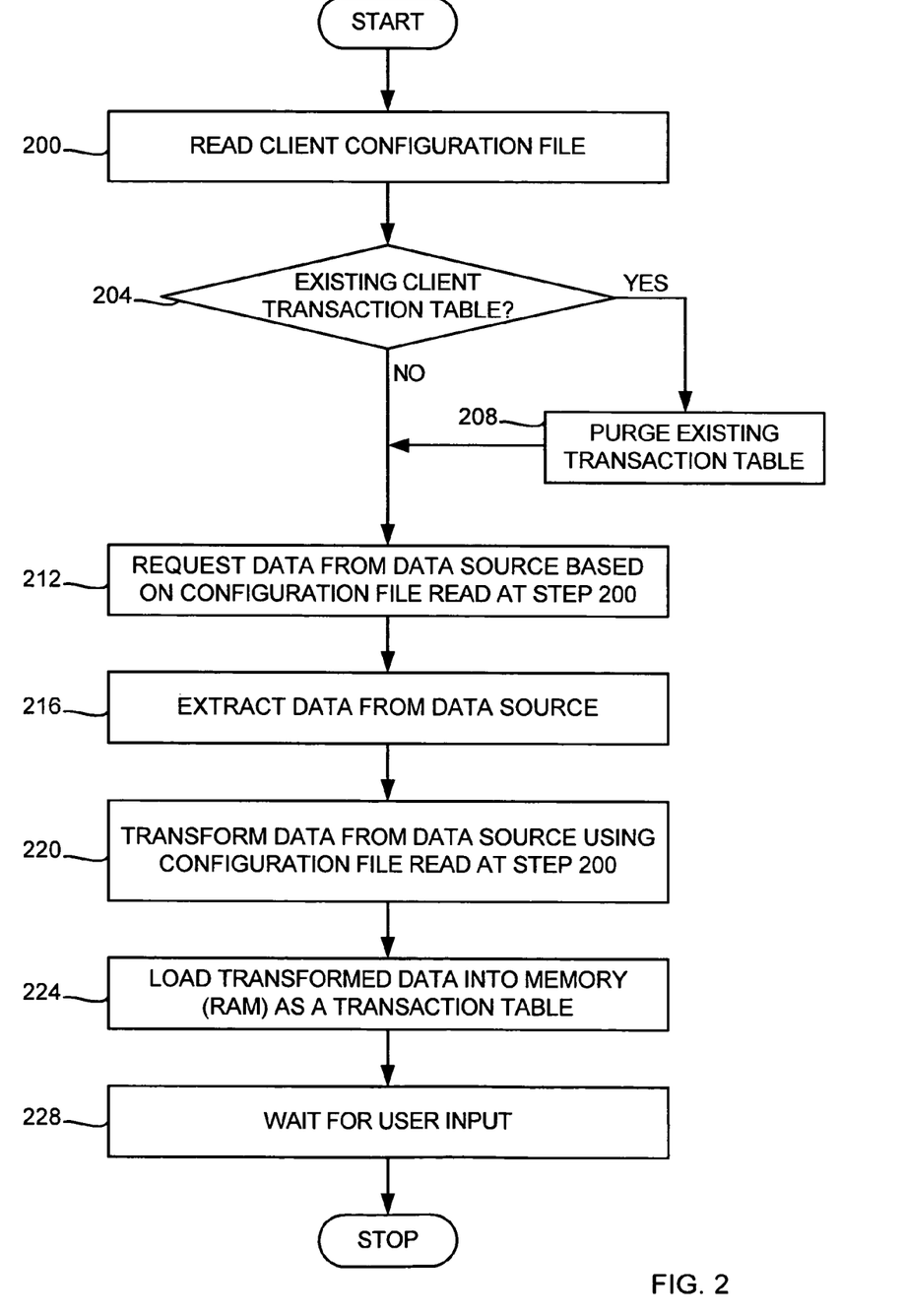
FIG. 2 is a flow chart illustrating a method of acquiring data from a data source and populating a transaction table in accordance with an embodiment of the present invention.

FIG. 2 is a flow chart illustrating a method of acquiring data from a data source and populating a transaction table in accordance with an embodiment of the present invention. At a step 200, a client configuration file is read. A client configuration file includes a number of parameters including, for example, mapping parameters and calculation parameters. As can be appreciated, mapping parameters may be generated to map data stored in a data warehouse prior to importing stored data into a desired data structure. In this manner, data from legacy systems may be preserved and formatted for a particular application. In addition, calculation parameters may be generated to create new data structures based on an imported data set. For example, a particular user may be interested in the difference between a statistical mean of a data set and a particular transaction entry as illustrated by the following equation:

$$\text{calculated value} = \text{entry value} - \text{mean value}$$

Equation 1: Example Calculated Value

The resulting calculated value may then be stored in a new data structure along with imported data. Any number of user defined calculation parameters may be incorporated into a client configuration file. In one embodiment of the present invention, an index is a calculation parameter. Index generation will be discussed in further detail for FIG. 3 below. In one embodiment of the present invention, a calculated value may be added to a transaction table created in step 224, which will be discussed in further detail below.

After a client configuration file is read, the method determines whether a transaction table all ready exists at step 204. Transaction tables, at a general level, represent the data extracted from the data source in table format along with calculated values. More particularly, a transaction table is a two dimensional table with rows and columns. Each row, in some embodiments, represent a transaction while each column represents some characteristic, description, or calculated value corresponding to a row. It may be appreciated that the designation of rows and columns is for convenience only since a transaction table may also be organized as columns representing transactions and rows representing characteristics, descriptions, or calculated values corresponding to a column.

Thus, for example, a transaction table may be populated as follows:

TABLE 1

Example Transaction Table

| transaction | date | price | region | = Price − Average Price | ... |
|---|---|---|---|---|---|
| 1 | Apr. 4, 2004 | 4.50 | SW | −.775 | ... |
| 2 | Apr. 4, 2004 | 7.50 | NE | 2.243 | ... |
| 3 | Apr. 5, 2004 | 3.75 | S | −1.525 | ... |
| 4 | Apr. 3, 2004 | 5.35 | W | .075 | ... |
| ... | ... | ... | ... | ... | ... |

In the above example, a transaction table is populated with four transactions and four columns of data corresponding to each transaction. Some of the entries may be defined as measurements which are typically numeric and others may be defined as dimensions which are typically descriptive elements of the transaction. It is noted that this table reflects actual values for the given fields; however, in some embodiments the values may be converted into expression objects which have the advantage of being syntactically equivalent so that operations on both measurements and definitions may be similarly processed. It is also noted that the above table contains only four transaction entries and five descriptive fields that are either measurements or dimensions. The present invention contemplates many more transactions and many more columns. In a preferred embodiment, the table may contain up to approximately three million records. In other preferred embodiments, the table may contain up to approximately one million records. Memory limitations described in these embodiments are due in part to the limitations associated with 32-bit architecture currently supported by most IT organizations. However, this limitation may be overcome by porting the present invention to a higher capacity 64-bit architecture and above.

If a transaction table is found at step 204, the method purges a found transaction table from memory at step 208. In this manner, old transaction tables are removed before new tables are formed thus avoiding data corruption. Once an old transaction table is purged, the method continues to step 212. If a transaction table is not found at step 204, the method continues to step 212 where data is requested from a data source in accordance with a configuration file read at step 200. A data source may be any of a number of data sources well-known in the art including, for example, Oracle databases or SAP databases. As noted above, configuration files map data source data to conform to a desired transaction table format. Once data has been extracted from a data source, extracted data is transformed at step 220 using a configuration file read at step 200. As noted above, a configuration file may contain, along with other parameters, calculation parameters to be applied to extracted data sets. For example, in Table 1 above, a calculated parameter illustrated is defined by the equation: calculated value=price−average price. Thus, for each transaction a value may be transformed by a calculation applied a transaction. In a preferred embodiment, at least one index is calculated. Indexes may be, without limitation, numeric values, or some other relative absolute value. Index calculations are discussed in further detail below for FIG. 3.

Once extracted data is transformed, a resulting data set is loaded into memory (RAM) as a transaction table containing all desired transactions from a data source along with all transformed data generated at step 224. As can be appreciated by one skilled in the art, 32-bit platforms can only address up to 4.0 gigabytes of physical memory (RAM) (i.e., $2^{32}$=4000 million). In WINDOWS™ operating system, processes are limited to 2.0 gigabytes of RAM. In some embodiments using Java Virtual Machine (JVM), the process space is further limited to 1.5 gigabytes of RAM. Thus, in a preferred embodiment, the amount of usable memory (RAM) for a transaction table is approximately 1.5 gigabytes. More preferably, the amount of usable memory (RAM) for a transaction table is approximately 1.0 gigabytes. As noted above, in systems utilizing 64-bit platforms, no such memory limitations are contemplated. After a transaction table is loaded into memory (RAM) at step 224, the system then waits for user input at as step 228 of the type described, for example, in FIG. 4.

Figure 3:
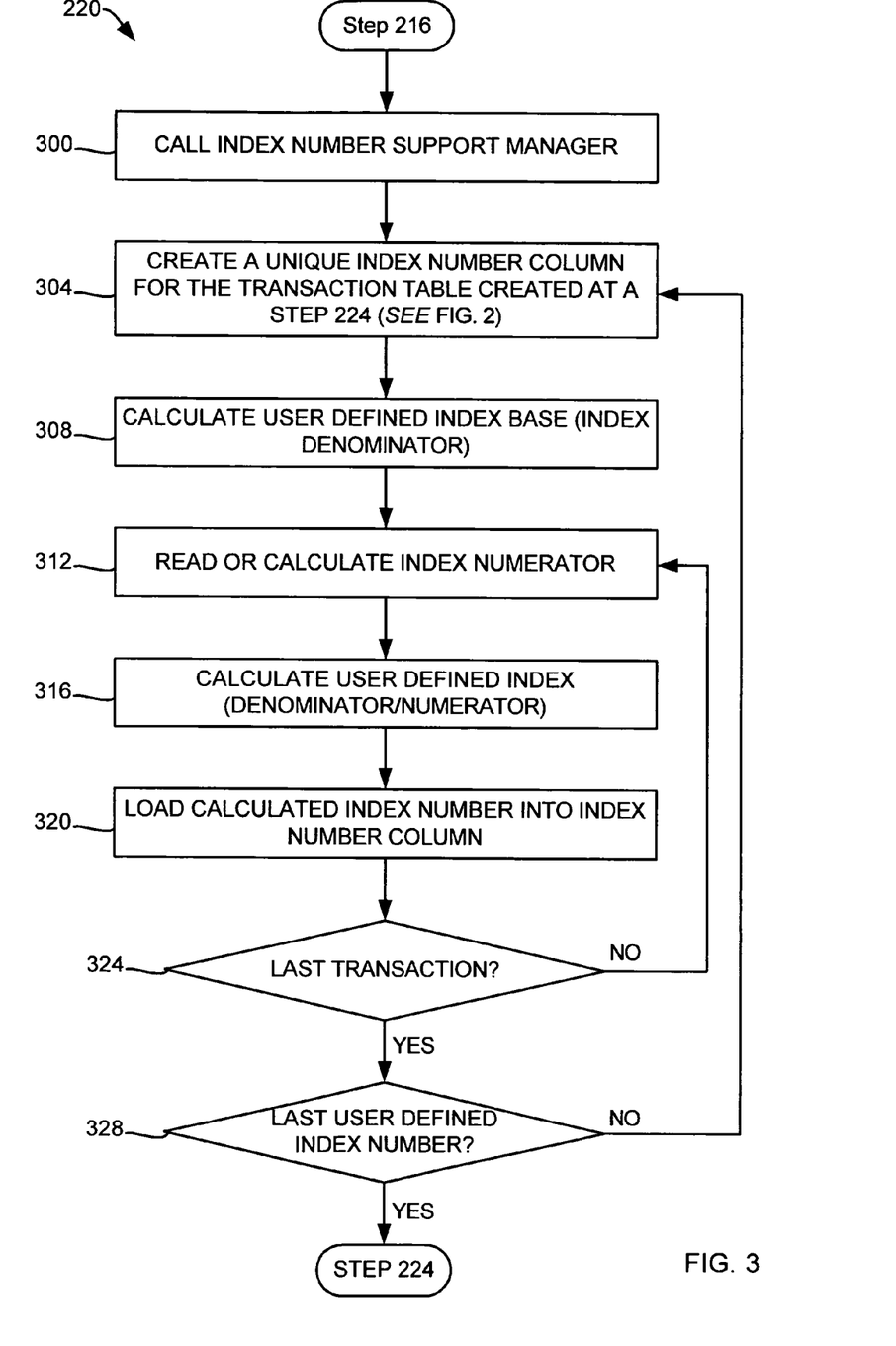
FIG. 3 is a flow chart illustrating a method of creating an index in accordance with an embodiment of the present invention.

FIG. 3 is a flow chart illustrating a method of creating an index in accordance with an embodiment of the present invention. An index is essentially a summary measure that states a relative comparison between groups of related items. A user may define an index to compare a metric from a selected transaction against a similar metric of a set of definable transactions. For example, a margin index (i.e., index) can be defined to express the relationship between the net margin of a transaction (i.e., selected transaction) and the average margin from the peer customers (i.e., set of definable transactions). Moreover the indexes can be rolled up by any arbitrary grouping such as by customer, by product, etc. Roll up, which is a data aggregation feature, will be discussed in further detail below for FIG. 7. Further, indexes, as contemplated by the present invention, may be used to drive future behavior in that an index may be compared against a current metric as opposed to typical use that uses indices to characterize past performance. Conventionally, a commonly used market indicator, for example, is the Standard & Poor's (S&P) composite index. The S&P composite index includes 500 of the largest (in terms of market value) stocks in the United States. As such, the S&P composite index indicates the general trend of a common-stock portfolio's past performance. However, the S&P composite index is not generally used to drive future behavior. That is, it is not generally used to indicate whether to purchase an individual stock.

As noted above for FIG. 2 at step 220, data from a data source is transformed in accordance with a configuration file. A configuration file may contain calculation parameters to be applied to an extracted data set. In a preferred embodiment, at least one index is calculated. It can be appreciated that one or many transformation events may occur at step 220. Turning to FIG. 3, FIG. 3 represents at least one transformation event corresponding to step 220. At a step 300, index support is called. A unique index column for the transaction table may be created at a step 304. An index column stores a value of the resulting index. An index base is then calculated at a step 308. An index base represents the denominator of an index. An index base may be a user defined set of transactions like, for example, the average of the list price less the invoice price in the south west region over the last 2 quarters. In this example, the average of the list price less the invoice price term results in a value while the regional and time interval terms are descriptive and serve to delimit an entire data set to a selected data set. Many different index bases are contemplated and may be utilized in the present invention without restriction.

An index numerator is then read or calculated at a step 312. A numerator may be a data entry like, for example, a list price or it may be a calculated value like, for example, list price less invoice price. In either case, a numerator may be stored in a transaction table. Once an index denominator and an index numerator are calculated at steps 308 and 312 respectively, an index may be calculated at step 316 and loaded into an index column at step 320. Using the above mentioned denominator and numerator, an example of an index formulation is illustrated according to the following equation:

Example index calculation  Equation 2

$$\text{Index} = \text{Price Realization} = \frac{\text{List Price} - \text{Invoice Price}}{AVG(\text{List Price} - \text{Invoice Price})}$$
(region = southwest;time = *previous2quarters*)

The method then determines whether another desired transaction exists for which an index may be calculated at step 324. If another desired transaction exists, the method returns to step 312 and cycles until all desired transactions are processed. When all transactions are processed, the method then determines whether all indexes have been processed at step 328. If more index calculations need processing, the method returns to step 304 and cycles until all index calculations have been processed. When all indexes have been processed, the method either returns to step 224 if all transformations are complete, or continues transforming data. Populating a transaction table to be loaded into memory (RAM) has been described above.

It can be appreciated that indexes, as disclosed may be calculated in real-time using a current data set. Furthermore, transforming data in accordance with the present invention does not result in the loss of information because a transaction table, upon which an index is calculated, is preserved. Thus, a user may freely explore data that underlies an index calculation, thus yielding a richer research tool. In addition, indexes, as contemplated by the present invention, may be rolled up. Generally speaking, roll up allows a user to summarize by field a set of data. In this example, because an underlying data set for a given index calculation is available; a user may select data descriptors that may further delineate an index calculation. Roll up will be discussed in further detail below for FIG. 7.

Figure 4:
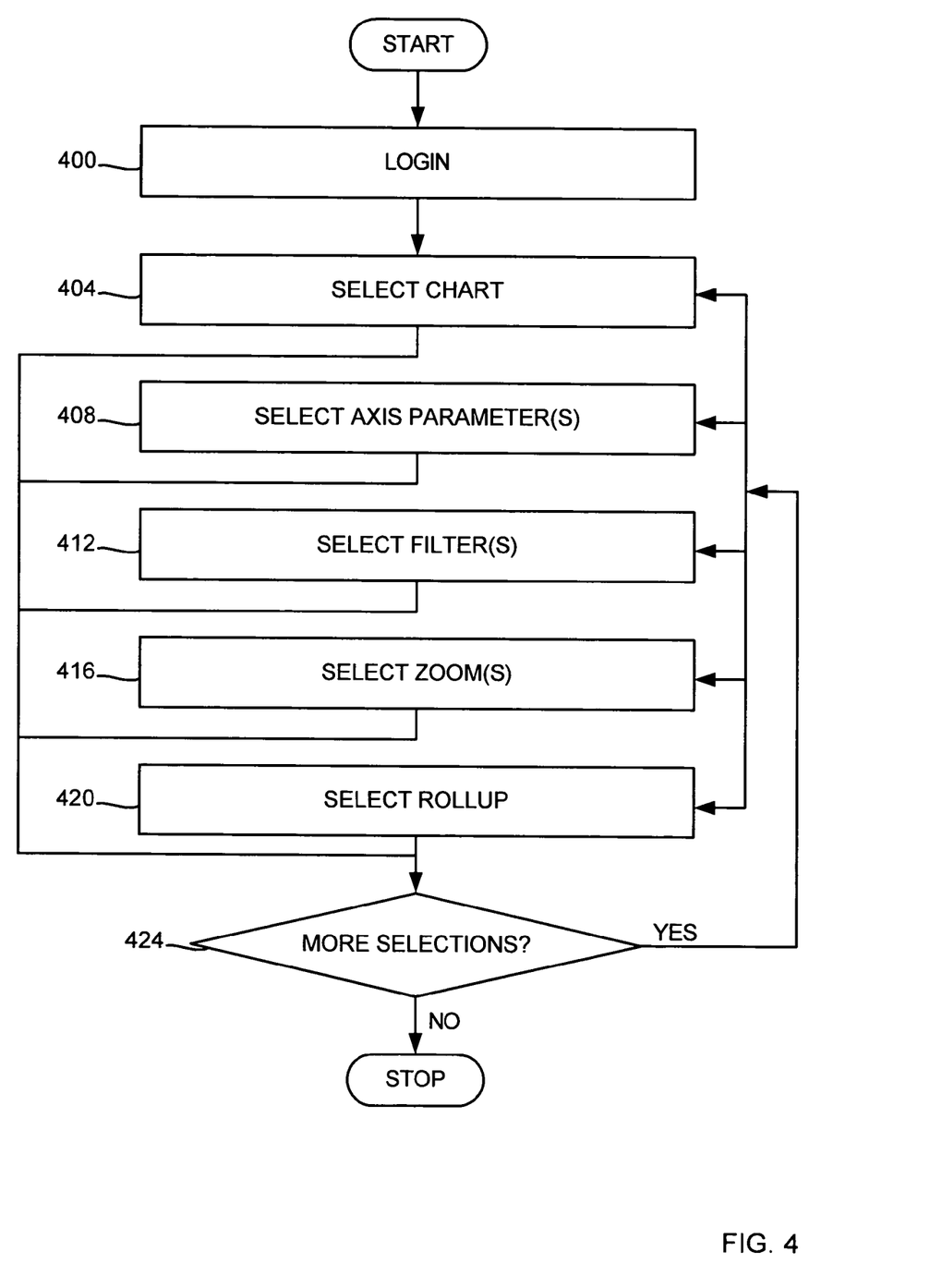
FIG. 4 is a flow chart illustrating a number of client operations in accordance with an embodiment of the present invention.

FIG. 4 is a flow chart illustrating a number of user operations in accordance with an embodiment of the present invention. At a step 400, a user may login to a client. As noted for FIG. 1, the commands generated by a client are transmitted to a server. A server may then return results to a client whereupon results may be graphically displayed for a user. Thus, user display may be updated upon each operation or command. Once a user has logged on, a chart may be selected at a step 404. Charts are graphical illustrations of data sets. In a preferred embodiment, price band, zebra, time series, multiple time series, scatter, and waterfall charts may be selected from the user interface. User interfaces contemplated under the present invention will be discussed in further detail below. Other charts are contemplated by the present invention and may include without limitation, bar charts, line charts, or pie charts.

After a user has selected a particular chart at step 404, a user may select appropriate axis parameters at a step 408. Axis parameters represent a desired data set to be plotted. For example, price indicators (y-axis parameter) may be plotted against temporal indicators (x-axis parameter) to determine the change in pricing over time. In like manner, temporal indicators (y-axis parameter) may be plotted against price indicators (x-axis parameter). Thus, selection of axis parameters may be highly flexible according to user preference. In some embodiments, indexes may be selected as axis parameters. In other embodiments, axis parameters may be selected from drop down menus that contain many possible parameters in accordance with a corresponding configuration file. Axis parameters may be further selected in any manner known in the art without limitation.

At another step 412, a user may select any of a number of different filters. Filters will be discussed in further detail below for FIG. 5. In general, filters allow a user to display a subset of the original data set based on a desired criterion. Filters applied in this manner retain the order in which they are applied and may be selectively removed from the order depending on user preferences. Filters are displayed in order of selection for the user. A user may also select a zoom at a step 416. Zoom will be discussed in further detail below for FIG. 6. In general, zoom further limits a displayed data set. In one embodiment, zooming is accomplished by graphically selecting, by mouse drag, an area that a user desires to expand. A resulting zoom is enlarged and displayed for a user containing data encompassed by an area selected. In other embodiments, zoom parameters may be manually entered. Zooms may be displayed in order of selection made by a user.

At another step 420, a user may select a roll up criteria. Roll up will be discussed in further detail below for FIG. 7. In general, roll up allows a user to aggregate data according to a selection criterion. Aggregated data may also be summarized in accordance with a desired axis parameter. For example, if price is displayed as an axis parameter and a user desires to roll up prices according to sales region, then a resulting roll up displays average prices for each sales region. The method continues until the method determines that no more operations are desired at step 424 whereupon the method ends.

It can be appreciated that the operations described under steps 408 through 420 may be selected in any order in accordance with a user's preferences. Furthermore, selections described under steps 412 and 416 may be multiply selected and preserved in any order in accordance with a user's preferences and may be displayed in a selection list. Still further, selections may be individually or multiply added to or removed from an existing selection list. In some alternate embodiments, filter data sets may be retained in and subsequently recovered from cache. In other alternate embodiments, zoom data sets may be retained in and subsequently recovered from cache. Recovering data sets from cache may realize performance gains and memory efficiencies. Finally, in an embodiment of the present invention, a user may select any type of chart under step 404 while preserving selections made previous to a chart selection. That is, in some embodiments, axis parameters, filters, zoom, and roll up may persist across chart selections.

Figure 5:
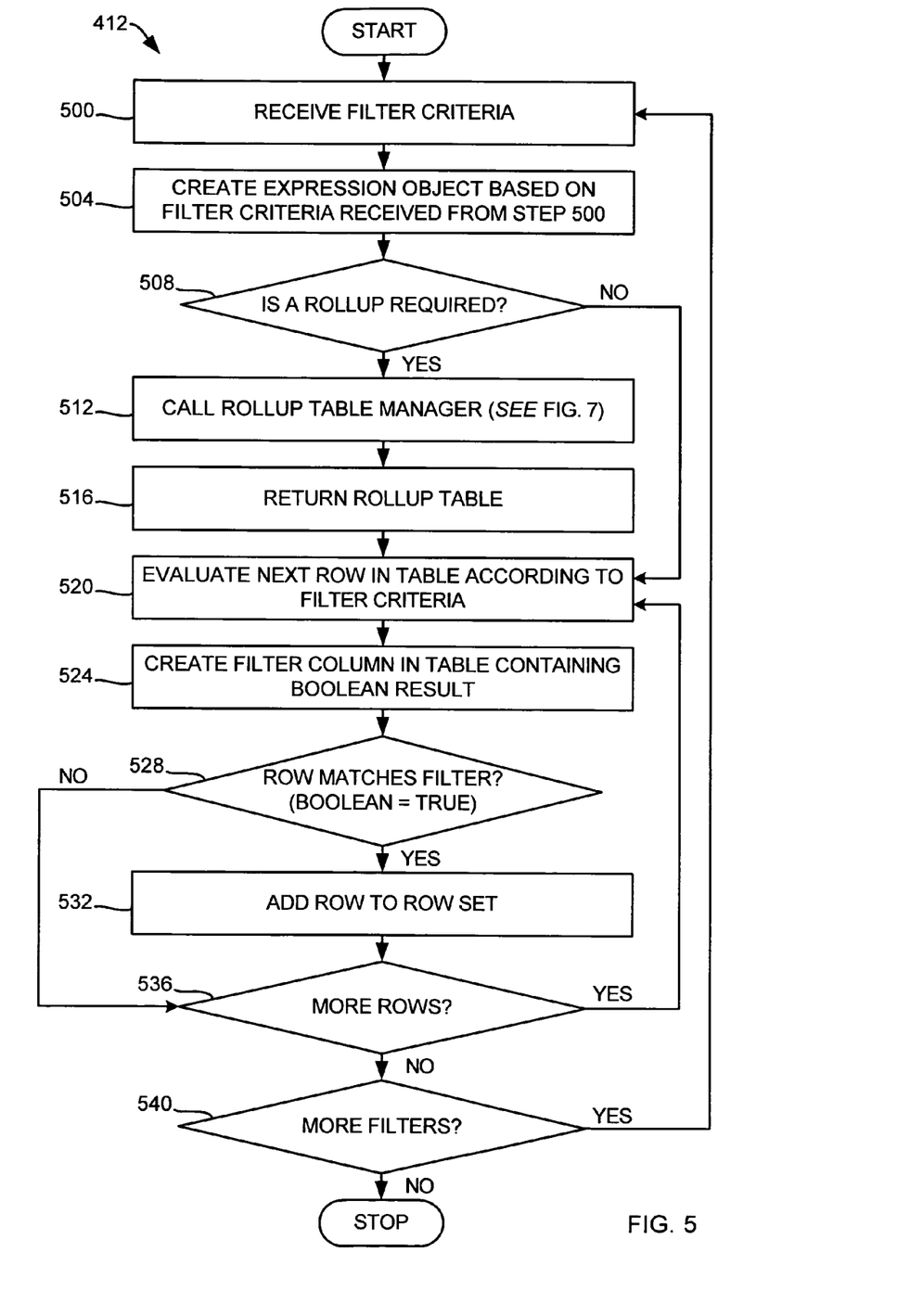
FIG. 5 is a flow chart illustrating a method of filtering data in accordance with an embodiment of the present invention.

FIG. 5 is a flow chart illustrating a method of filtering data in accordance with an embodiment of the present invention. In particular, the flow chart further illustrates step 412 of FIG. 4. At a step 500, filter criterion selected by a user is received. As noted above, filter criterion may be selected or input by a user. Typically, filter criterion limits data in accordance with known operands as for example: =, <, >, ≦, ≧, AND, OR, etc. Furthermore, filters may be organized by dimension and by measure. Dimension is an attribute of a transaction that can have any one of a known list of values. For example, every transaction has customer and there is a known set of customers. Thus customer is an example of a dimension. A dimension may have a flat list of values or it may have a hierarchical list. Measure is an attribute that has a numeric value. In some embodiments, a value may be an amount of money. Thus, selection by measure is a selection based on a numeric value.

After filter criterion is received, an expression object based on a received filter criterion is created at a step 504. Creation of an expression object allows for efficient syntactical processes to be achieved that may result in performance advantages. Once an expression object is created for a filter at step 504, a determination is made as to whether a roll up table is required. As noted above, a roll up allows a user to aggregate data according to a selection criterion. Aggregated data may also be summarized in accordance with a desired axis parameter. Roll up requirements must be considered before a filter is applied to a data set because a rolled up data set may respond differently to a selected filter than an original data set. Roll up will be discussed in further detail below for FIG. 7. If a roll up is required, the method calls roll up manager at a step 512. A roll up table is then returned at step 516 and the method continues to step 520. If the method determines at step 508 that a roll up is not required, the method continues to step 520.

At a step 520, a row in a table (e.g., transaction table, or roll up table) is evaluated according to a filter expression object. A filter column corresponding to a selected filter may then be created in a table to hold a Boolean result of the evaluation of step 520 at step 524. The method then determines whether a row under examination matches a selected filter (i.e., Boolean=true) at a step 528. If a row under examination matches a selected filter, then that row is added to a row set representing a set of data matching a selected filter at a step 532. The method then determines whether more rows need evaluation at step 536. If more rows need evaluating, the method returns to step 520 and cycles until all rows in a table are evaluated. If, at step 528, a row under examination does not match a selected filter (i.e., Boolean=false), then the row under examination is not added to a row set and the method continues at step 536 to determine whether more rows need evaluation. As noted above, if more rows need evaluating, the method returns to step 520 and cycles until all rows in a table are evaluated.

When all rows have been evaluated, the method continues at a step 540 to determine whether additional filters have been selected. If additional filters have been selected, the method returns to step 500 and cycles and continues until all filters have been evaluated. The method then ends. Note that each filter selection requires roll up evaluation to assure that the roll up is properly applied in a sequence of selected operations.

Figure 6:
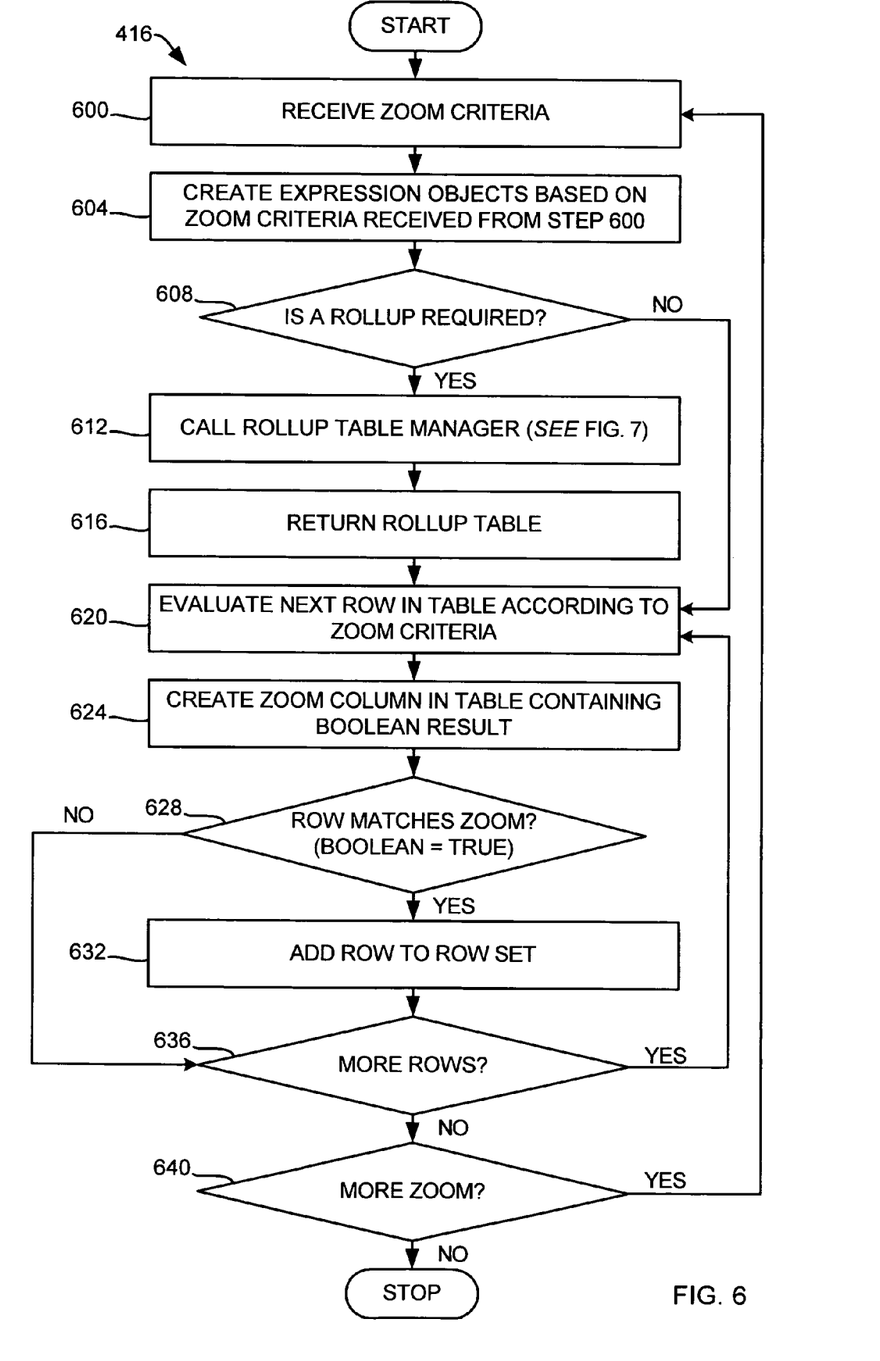
FIG. 6 is a flow chart illustrating a method of zooming in on data in accordance with an embodiment of the present invention.

FIG. 6 is a flow chart illustrating a method of zooming in on data in accordance with an embodiment of the present invention. In particular, the flow chart further illustrates step 416 of FIG. 4. As noted above, in general, zoom further limits a displayed data set. In one embodiment, zooming is accomplished by selecting an area by mouse drag that a user desires to expand. A resulting zoom is enlarged and displayed for a user containing data encompassed by an area selected. In other embodiments, zoom parameters may be manually entered. A zoom criteria results in what may be thought of as a multiple filter. Thus, for a given chart, if a user selected, by mouse drag, an area of interest, the method would return a set of parameters corresponding to an area of interest. For example, if a chart of price (y-axis) over time (x-axis) is displayed, a user may select an area of a displayed chart by mouse drag. The method would then return upper and lower parameters for both axes corresponding to a selected area. Thus, an area greater than selected upper parameters and less than selected lower parameters may be displayed. In this manner, data is filtered by upper and lower parameters therefore allowing processing using the same logic as for a filter selection.

At a step 600, zoom criteria selected by a user are received. As noted above, zoom criteria may be selected (by mouse drag) or manually input by a user. Typically, zooms may be organized by dimension and by measure. Dimension is an attribute of a transaction that can have one of a known list of values. For example, every transaction has customer and there is a known set of customers. Thus customer is an example of a dimension. A dimension may have a flat list of values or it may have a hierarchical list. Measure is an attribute that has a numeric value. In some embodiments, a value may be an amount of money. Thus, selection by measure is a selection based on a numeric value.

After zoom criteria are received, an expression object based on received zoom criteria is created at a step 604. As noted above, creation of an expression object allows for efficient syntactical processes to be achieved that may result in performance advantages. Once an expression object is created for a zoom at step 604, a determination is made as to whether a roll up table is required. As noted above, a roll up allows a user to aggregate data according to a selection criterion. Aggregated data may also be summarized in accordance with a desired axis parameter. Roll up requirements must be considered before a zoom is applied to a data set because a resulting roll up data set may respond differently to a selected zoom than an original data set. Roll up will be discussed in further detail below for FIG. 7. If a roll up is required, the method calls roll up manager at a step 612. A roll up table is then returned at step 616 and the method continues to step 620. If the method determines at step 608 that a roll up is not required, the method continues to step 620.

At a step 620, a row in the table (e.g., transaction table, or roll up table) is evaluated according to a zoom expression object. A zoom column corresponding to a selected zoom is then created in a table to hold a Boolean result of the evaluation of step 620 at step 624. The method then determines whether a row under examination matches a selected zoom (i.e., Boolean=true) at a step 628. If a row under examination matches a selected zoom, that row under examination is added to a row set representing a set of data matching a selected zoom at a step 632. The method then determines whether more rows need evaluation at step 636. If more rows need evaluating, the method returns to step 620 and cycles until all rows in a table are evaluated. If, at step 628, a row under examination does not match a selected zoom (i.e., Boolean=false), then that row under examination is not added to a row set and the method continues at step 636 to determine whether more rows need evaluation. As noted above, if more rows need evaluating, the method returns to step 620 and cycles until all rows in a table are evaluated.

When all rows have been evaluated, the method continues at a step 640 to determine whether additional zooms have been selected. If additional zooms have been selected, the method returns to step 600 and cycles and continues until all zooms have been evaluated. The method then ends. Note that each zoom selection requires roll up evaluation to assure that a roll up is properly applied in a sequence of selected operations. Note that the use of an expression object allows for substantially identical syntactical processing and may result in more efficient code.

Figure 7:
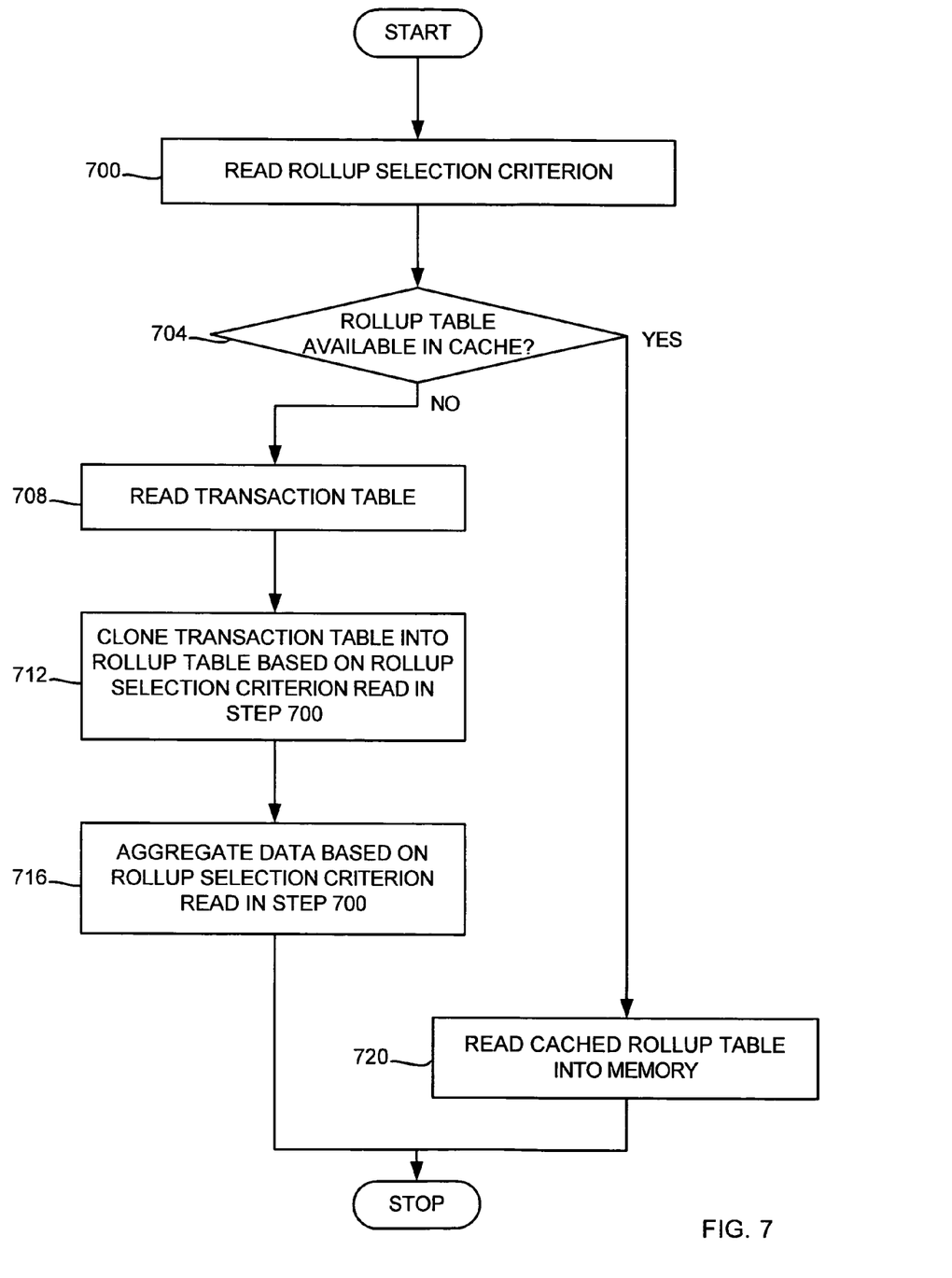
FIG. 7 is a flow chart illustrating a method of rolling up data in accordance with an embodiment of the present invention.

FIG. 7 is a flow chart illustrating a method of rolling up data in accordance with an embodiment of the present invention. As noted above, a roll up allows a user to aggregate data according to a user selected criterion. Aggregated data may also be summarized in accordance with a desired axis parameter. For example, a chart displaying price points over time may be rolled up to reduce a selected data set. In this example, a user may, for example, select a roll up based on sales region. The price points would then be sorted and summarized by sale region.

At a step 700, a roll up selection criterion is read. Roll up selection criterion may be selected by menu or by input as desired by a user. The method continues at a step 704 to determine whether a roll up table matching a roll up selection criterion is available in cache. By using cached tables, the method may achieve performance advantages over prior art methodologies. If a roll up table exists in cache, a cached roll up table is read into memory at a step 720 whereupon the method ends. If a roll up table is not available, the method reads a transaction table at a step 708 that was created at step 224, FIG. 2. A transaction table is the basis upon which a roll up table is cloned at step 712. A cloned roll up table contains all transactions matching a user selected roll up criterion read at step 700. Any transactions not matching a user selected roll up criterion are not cloned into a roll up table. A transaction table that is being cloned remains in memory unaltered. The method then aggregates data based on a selection criterion at step 712 so that summarized data may be displayed for a user. The method then ends.

While this invention has been described in terms of several preferred embodiments, there are alterations, permutations, modifications and various substitute equivalents, which fall within the scope of this invention. For example, the portfolios illustrated in FIG. 5 are illustrative only and may be organized within the approval hierarchy in numerous wars. It should also be noted that there are many alternative ways of implementing the methods and systems of the present invention. It is therefore intended that the following appended claims be interpreted as including all such alterations, permutations, modifications, and various substitute equivalents as fall within the true spirit and scope of the present invention.

What is claimed is:

1. A system for displaying a transaction table including at least one index, useful in association with price modeling and useful in association with a data source, the system comprising:

a database configured to store transaction data, including price modeling data, from the data source and dynamically store changes to the transaction data, including price modeling data, from the data source, and further configured to provide client configuration of the data source, wherein the client configuration includes at least one calculation parameter and at least one mapping parameter and wherein the price modeling data depends upon the client configuration;

at least one server coupled to the database over a network and configured to:
  request the transaction data including price modeling data from the database via the network, wherein the transaction data is requested in accordance with the at least one mapping parameter;
  populate the transaction table with the price modeling data;
  calculate at least one index base using the price modeling data populated in the transaction table, wherein the at least one index base is the denominator of the at least one index, and wherein the at least one index base is calculated according to the at least one calculation parameter;
  identify at least one index numerator from the price modeling data populated in the transaction table,
  generate the at least one index by dividing the at least one index numerator by the at least one index base, wherein the at least one index is a summary measure stating relative comparisons between groups of related items;
  dynamically update the at least one index in response to changes in the price modeling data;
  configure the transaction table to include at least one index column and load the at least one index into the at least one index column;

a display coupled to the server and configured to display at least one of the at least one index in the transaction table, and wherein the display is also configured to display a limited subset of the transaction table, where the subset is selected by a zoom function.

2. The system of claim 1 further comprising a data aggregation module for aggregating the at least one index according to a selection criteria, wherein the selection criteria is user defined, and wherein the display is configured to display at least one of the at least one computed index and the at least one aggregated index.

3. The system of claim 2 wherein the display displays the at least one of the at least one index and the at least one aggregated index in a transaction table.

4. The system of claim 2 wherein the at least one index base includes a user defined set of transactions.

5. The system of claim 2 wherein the at least one index numerator includes transaction data.

6. The system of claim 5 wherein the at least one index numerator includes an equation.

7. A method implemented by a computer system for displaying a transaction table including at least one index, useful in association with price modeling and useful in association with a data source, the method comprising:
  storing, by the computer system, transaction data, including price modeling data, received from the data source in a database, and storing, by the computer system, changes to the transaction data, including price modeling data, in the database;
  providing, by the computer system, a client configuration of the data source, and wherein the client configuration includes at least one calculation parameter, and at least one mapping parameter and wherein the price modeling data depends upon the client configuration;
  requesting, by the computer system, the transaction data including price modeling data from the database via a network, wherein the transaction data is requested in accordance with the at least one mapping parameter;
  populating, by the computer system, the transaction table with the price modeling data;
  calculating, by the computer system, at least one index base using the price modeling data populated in the transaction table, wherein the at least one index base is the denominator of the at least one index, and wherein the at least one index base is calculated according to the at least one calculation parameter;
  identifying, by the computer system, at least one index numerator from the price modeling data populated in the transaction table;
  generating, by the computer system, the at least one index by dividing the at least one index numerator by the at least one index base, and wherein the at least one index is a summary measure stating relative comparisons between groups of related items;
  dynamically updating, by the computer system, the at least one index in response to changes in the price modeling data;
  configuring, by the computer system, the transaction table to include at least one index column and load the at least one index into the at least one index column;
  displaying, by the computer system, on a display at least one of the at least one index in the transaction table; and
  displaying, by the computer system, a limited subset of the transaction table, where the subset is selected by a zoom function.

8. The method of claim 7 further comprising aggregating, by the computer system, the at least one index according to a selection criteria, wherein the selection criteria is user defined, and displaying, by the computer system, at least one of the at least one index and the at least one aggregated index.

9. The method of claim 8 wherein the displaying, by the computer system, the at least one of the at least one index and the at least one aggregated index utilizes a transaction table.

10. The method of claim 8 wherein the at least one index base includes a user defined set of transactions.

11. The method of claim 8 wherein the at least one index numerator includes transaction data.

12. The method of claim 11 wherein the at least one index numerator includes an equation.

13. A computer readable medium having executable instructions which when executed cause a computer to perform steps for displaying a transaction table including at least one index, useful in association with price modeling and useful in association with a data source, comprising:
  storing transaction data, including price modeling data, received from the data source in a database, and storing, by the computer system, changes to the transaction data, including price modeling data, in the database;
  providing a client configuration of the data source, and wherein the client configuration includes at least one calculation parameter and at least one mapping parameter and wherein the price modeling data depends upon the client configuration;
  requesting the transaction data, including price modeling data, from the database via a network, wherein the data is requested in accordance with the at least one mapping parameter;
  populating the transaction table with the price modeling data;
  calculating at least one index base using the price modeling data populated in the transaction table, wherein the at least one index base is the denominator of the at least one index, and wherein the at least one index base is calculated according to the at least one calculation parameter;

identifying at least one index numerator from the price modeling data populated in the transaction table; and generating the at least one index by dividing the at least one index numerator by the at least one index base, and wherein the at least one index is a summary measure stating relative comparisons between groups of related items;

dynamically updating the at least one index in response to changes in the price modeling data;

configuring the transaction table to include at least one index column and load the at least one index into the at least one index column;

displaying at least one of the at least one index in the transaction table; and displaying, by the computer system, a limited subset of the transaction table, where the subset is selected by a zoom function.

14. The computer readable medium of claim 13 having executable instructions which when executed cause the computer to perform steps further comprising aggregating the at least one index according to a selection criteria, wherein the selection criteria is user defined, and displaying at least one of the at least one index and the at least one aggregated index.

15. The computer readable medium of claim 14 having executable instructions which when executed cause the computer to perform steps further comprising displaying the at least one of the at least one index and the at least one aggregated index in a transaction table.

16. The computer readable medium of claim 14 wherein the at least one index base includes a user defined set of transactions.

17. The computer readable medium of claim 14 wherein the at least one index numerator includes transaction data.

18. The computer readable medium of claim 17 wherein the at least one index numerator includes an equation.

* * * * *

UNITED STATES PATENT AND TRADEMARK OFFICE
CERTIFICATE OF CORRECTION

PATENT NO. : 7,640,198 B1  Page 1 of 1
APPLICATION NO. : 10/856335
DATED : December 29, 2009
INVENTOR(S) : Albanese et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this

Twenty-first Day of December, 2010

David J. Kappos
*Director of the United States Patent and Trademark Office*